Nov. 15, 1932.         W. F. BIELICKE         1,888,156
OBJECTIVE LENS SYSTEM
Filed March 3, 1932
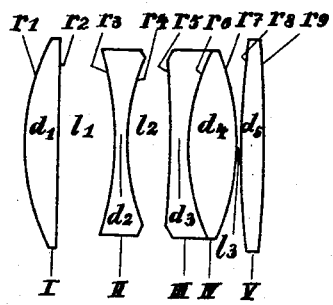
|  |  | $n_D$ | $n_G$ | $\nu$ |
|---|---|---|---|---|
| $r_1 = +42,2$ |  |  |  |  |
| $r_2 = \infty$ | $d_1 = 7,2$  I | 1,6580 | 1,6741 | 51,4 |
| $r_3 = -65,4$ | $l_1 = 11,4$ |  |  |  |
| $r_4 = +42,9$ | $d_2 = 2,4$  II | 1,6741 | 1,7015 | 32,0 |
| $r_5 = -213,1$ | $l_2 = 9,2$ |  |  |  |
| $r_6 = +36,7$ | $d_3 = 2,4$  III | 1,5821 | 1,5998 | 42,0 |
| $r_7 = -52,1$ | $d_4 = 9,6$  IV | 1,6580 | 1,6741 | 51,4 |
| $r_8 = +252,5$ | $l_3 = 1,1$ |  |  |  |
| $r_9 = -252,5$ | $d_5 = 4,8$  V | 1,6513 | 1,6732 | 38,3 |
*Inventor:*
Willy F. Bielicke Patented Nov. 15, 1932

1,888,156

UNITED STATES PATENT OFFICE

WILLY F. BIELICKE, OF BERLIN-HALENSEE, GERMANY

OBJECTIVE LENS SYSTEM

Application filed March 3, 1932, Serial No. 596,650, and in Germany January 22, 1931.

This invention relates to objective lens systems, such as are used for photographic, microscopic, projection and similar purposes, the chief object of the invention being to provide a lens system of this character corrected for spherical and chromatic aberration, astigmatism, distortion and coma and having a very large relative aperture. An application for patent has been filed in Germany under date of January 22, 1931, under B 147,919 IX/42h.

The specification of Patent 1,540,752 of June 9, 1925, describes an objective lens being composed of three collective lenses enclosing a dispersive lens. One of the collective lenses is placed on that side of the dispersive lens which faces the incident light and the other two collective lenses are placed on the other side of the dispersive lens.

The object of my invention is to improve the covering power of this lens by which is understood a better correction of the residual aberrations for oblique beams of light. This is obtained by introducing a cemented collective lens surface in one or more of the collective lens elements. I make one of the collective elements of two lenses cemented together by Canada balsam, one being a dispersive lens of flint glass and the other being a collective lens of crown glass having a higher refractive index and a lower dispersion than the flint glass.

It is known that the aberrations of a collective lens decrease as the refractive index increases. In high speed objective lenses generally crown glasses are used the refractive index of which is not higher than 1.625. Not long ago manufacturers of optical glass were able to produce a baryta crown glass having a refractive index for the D-line of the spectrum as high as 1.658, the relative dispersion, which is generally called by the letter $v$, being round 51. If one would replace the collective lenses in the objective described in Patent No. 1,540,752 by lenses made of this new crown glass with high refractive index, flatness of field would be improved, but the high dispersion of the new crown glass would require that the single dispersive lens be made of a very heavy flint glass to obtain chromatic correction. These kind of glasses cannot be used in high speed objectives on account of their intensive yellow tint and their strong absorption of the blue light rays. The combined lens system can be corrected for chromatic aberration using a dense flint glass of not too high a refractive index if one or more of the collective members are made of two lenses as described above.

The data for making an objective lens according to my invention are shown in the drawing. The equivalent focal length is 100 mm., the relative aperture f:2, 5.

| | | $nD$ | $nG$ | $v$ |
|---|---|---|---|---|
| $r_1 = +\ 42.2$ | | | | |
| | $d_1 = 7.2$ | I 1.6580 | 1.6741 | 51.4 |
| $r_2 = \infty$ | | | | |
| | $l_1 = 11.4$ | | | |
| $r_3 = -\ 65.4$ | | | | |
| | $d_2 = 2.4$ | II 1.6741 | 1.7015 | 32.0 |
| $r_4 = +\ 42.9$ | | | | |
| | $l_2 = 9.2$ | | | |
| $r_5 = -213.1$ | | | | |
| | $d_3 = 2.4$ | III 1.5821 | 1.5998 | 42.0 |
| $r_6 = +\ 36.7$ | | | | |
| | $d_4 = 9.6$ | IV 1.6580 | 1.6741 | 51.4 |
| $r_7 = -\ 52.1$ | | | | |
| | $l_3 = 1.1$ | | | |
| $r_8 = +252.5$ | | | | |
| | $d_5 = 4.8$ | V 1.6513 | 1.6732 | 38.3 |
| $r_9 = -252.5$ | | | | |

The characters $r_1$ to $r_9$ inclusive indicate the radii of curvature of the lenses from left to right respectively. The light is presumed to be incident from left to right and all curvatures that are convex toward the incident light are positive and those that are concave are negative.

The characters $d_1$ to $d_5$ inclusive indicate the axial dimensions of the glass thicknesses and the characters $l_1$ to $l_3$ inclusive the air spaces.

The characters $nD$ and $nG$ denote the refractive indices for the D line and the G line of the spectrum, the character $v$ the relative dispersion of the glasses of which lenses I to V are made.

I claim as my invention:

1. In an objective lens system for photographic, microscopic, projection and similar purposes, the combination of three collective lenses enclosing a dispersive lens, one of the collective lenses being located on that side of the dispersive lens that faces the incident light, the other two collective lenses being placed on the opposite side of the dispersive lens and at least one of the latter two collective lenses being composed of a dispersive flint glass lens member, and a collective crown glass lens member having a higher refractive index and lower dispersion than the flint glass member and being cemented to that side of the flint glass member which is away from the incident light.

2. In an objective lens system for photographic, microscopic projection and similar purposes, the combination of four lenses, three of these being collective and enclosing a dispersive lens, one or both of the collective lenses behind the dispersive lens being composed of a dispersive flint glass lens and a collective crown glass lens having a higher refractive index and lower dispersion than the flint glass lens, the collective lenses made of glass having a refractive index higher than 1.65 for the D-line of the spectrum.

In testimony whereof I affix my signature.

WILLY F. BIELICKE.